(12) United States Patent
Yu et al.

(10) Patent No.: US 12,647,048 B2
(45) Date of Patent: Jun. 2, 2026

(54) SOFT-SWITCHING INVERTER WITH FREQUENCY DETERMINED BY AVERAGE PHASE DIFFERENCE

(71) Applicant: AcLeap Power Inc., Taipei City (TW)

(72) Inventors: Qixue Yu, Shanghai (CN); Ming Fu, Shanghai (CN); Lishen Zhou, Shanghai (CN)

(73) Assignee: AcLeap Power Inc., Taipei City (TW)

( * ) Notice: Subject to any disclaimer, the term of this patent is extended or adjusted under 35 U.S.C. 154(b) by 177 days.

(21) Appl. No.: 18/616,752

(22) Filed: Mar. 26, 2024

(65) Prior Publication Data

US 2024/0364235 A1      Oct. 31, 2024

(30) Foreign Application Priority Data

Apr. 26, 2023    (CN) .......................... 202310463157.7

(51) Int. Cl.
  H02M 7/5387      (2007.01)
  H02M 1/00      (2006.01)
  H02M 7/5395      (2006.01)

(52) U.S. Cl.
  CPC ..... H02M 7/53871 (2013.01); H02M 1/0058 (2021.05); H02M 7/5395 (2013.01)

(58) Field of Classification Search
  CPC .......................... H02M 7/5395; H02M 1/0058
  See application file for complete search history.

(56) References Cited

U.S. PATENT DOCUMENTS

| | | | | | |
|---|---|---|---|---|---|
| 5,400,236 | A | * | 3/1995 | Shimizu ............... | H02H 7/1206 |
| | | | | | 363/56.05 |
| 11,258,373 | B2 | * | 2/2022 | Sohn ......................... | H03H 7/30 |
| 2011/0222651 | A1 | * | 9/2011 | Ogawa ..................... | H05G 1/20 |
| | | | | | 378/107 |

OTHER PUBLICATIONS

M. Nakaoka, T. Maruhashi, T. Koga, S. Sugawara and T. Nishimura, "A phase-difference angle control-mode PWM high-frequency resonant inverters using static induction-transistors and-thyristors," 1987 IEEE Power Electronics Specialists Conference, Blacksburg, VA, USA, 1987, pp. 674-681 (Year: 1987).*

* cited by examiner

*Primary Examiner* — Peter M Novak
(74) *Attorney, Agent, or Firm* — CKC & Partners Co., LLC

(57) ABSTRACT

In one embodiment, a switching frequency adjusting circuit includes an inverter circuit, a phase difference determining circuit, an average determination circuit, and a loop compensator. The inverter circuit includes an inverter switch configured to switch on and off at a switching frequency. The phase difference determination circuit is configured to obtain a first signal related to an output voltage of the inverter circuit and a second signal related to an output current of the inverter circuit. The average determination circuit is configured to determine a first average value of a first output signal and a second average value of a second output signal, and the loop compensator is configured to compare the first average value or the second average value with a reference value and adjust the switching frequency of the inverter switch based on the comparison result.

20 Claims, 7 Drawing Sheets

SOFT-SWITCHING INVERTER WITH FREQUENCY DETERMINED BY AVERAGE PHASE DIFFERENCE

CROSS-REFERENCE TO RELATED APPLICATIONS

This application claims priority to Chinese Patent Application No. 202310463157.7, filed Apr. 26, 2023, and titled "SWITCHING FREQUENCY ADJUSTING CIRCUIT AND DEVICE COMPRISING THE SAME", which is hereby incorporated by reference in its entirety.

BACKGROUND

Embodiments of the present disclosure mainly relate to an integrated circuit and more specifically, to a circuit that adjusts switching frequency of switches of full bridge inverters or half bridge inverters, and a device (e.g., a wireless charging transformer system etc.) including the circuit.

Theoretically, in a compensation network of the transformer, the resonant frequency of the compensation network can be determined once the inductance value and the capacitance value of the compensation network have been ascertained. However, in practical applications, inductance and capacitance of the compensation network and self-inductance at primary and secondary sides of the transformer with loose coupling could not remain consistent among different production batches. In such case, tolerance exists in the above parameters. For example, the capacitance has an error of ±5%, and the inductance and the self-inductance respectively have an error of ±10%. A further important influencing factor is described below. In the case that a distance between the primary side coil and the secondary side coil (the primary and secondary sides of the transformer of the wireless charger are formed in the form of pads, and energy are delivered through coupling of the magnetic fields) varies from one transformer to another transformer, their self-inductances are affected. The switching frequency under which the inverter switch operates is set in accordance with nominal values of the inductance and the capacitance. In actual chargers, the switching frequency under which the inverter switch operates may greatly deviate from the actual resonant frequency of the compensation network. Thus, the charger could not work in the optimal state.

On this basis, it is required to identify the resonant frequency of the compensation network online, such that the inverter can operate at the resonant frequency identified online. Furthermore, it is also required that the inverter switch can implement a soft switching state to minimize the switch loss.

BRIEF DESCRIPTION

In accordance with example embodiments of the present disclosure, there is provided a switching frequency adjusting circuit that can implement soft switching of the inverter switch and further identify the resonant frequency of the compensation network online. Meanwhile, the inverter can operate under the resonant frequency, such that the operating frequency of the switch is close to the resonant frequency of the inverter and the reactive power is reduced or even eliminated.

In a first aspect of the present disclosure, there is provided a switching frequency adjusting circuit, including: an inverter circuit including an inverter switch switched on and off at a switching frequency; a phase difference determination circuit connected to the inverter circuit for obtaining a first signal related to an output voltage of the inverter circuit and a second signal related to an output current of the inverter circuit, and configured to compare a phase of the first signal with a phase of the second signal, and selectively output a first output signal and a second output signal based on a comparison result, wherein the first output signal is associated with a phase difference between the first signal and the second signal, and the second output signal is related to a fixed value; an average determination circuit configured to determine a first average value of the first output signal and a second average value of the second output signal; and a loop compensator configured to compare the first average value or the second average value with a reference value and adjust the switching frequency of the inverter switch based on a comparison result, wherein the reference value is associated with a phase difference required for implementing soft switching of the inverter switch.

A phase relation between the output voltage and the output current of the inverter circuit may be obtained online in real time through the switching frequency adjusting circuit of the present disclosure. The resonant frequency of the compensation network of the inverter circuit can be identified online by comparing the phases of the output voltage and the phase of the output current. By setting up the reference value for the phase difference in an appropriate way, the inverter can operate near the resonant frequency and the soft switching of the inverter switch may be implemented at the same time. In addition, by means of the average determination circuit and the loop compensator included in the switching frequency adjusting circuit, the alternating input signal can be filtered into DC currents, so as to eliminate various interferences or signal oscillations introduced by the analog circuit. The anti-interference capability of the circuit is thus enhanced.

In some embodiments, the average determination circuit includes a low pass filter, and the first output signal includes alternating high level and low level, the first average value is related to duty cycle of the high level and the low level, and the second average value is zero. The average value is simply determined by the low pass filter, so as to filter the alternating input signal to DC signal. This facilitates the adjustment operation of the loop compensator and lowers the adjusting frequency, thereby enhancing the anti-interference capability of the circuit.

In some embodiments, the phase difference determination circuit includes: a first signal acquisition circuit configured to compare the output voltage of the inverter circuit with a zero voltage to obtain the first signal; a second signal acquisition circuit configured to compare the output current of the inverter circuit with a zero current to obtain the second signal; and a logic operation circuit configured to compare the first signal with the second signal, output the first output signal in the case that the phase of the first signal is ahead of a phase of the second signal, and output the second output signal in the case that the phase of the first signal lags behind the phase of the second signal. The digital logic signals related to the phase of the output voltage and the phase off the output current are obtained and further compared by the logic operation circuit, so as to distinguish the case where the voltage is ahead of the current from the further case where the voltage lags behind the current. Accordingly, the switching frequency is adjusted respectively for the above two cases.

In some embodiments, the logic operation circuit includes: an XOR operation circuit configured to receive the first signal and the second signal, output a high level when a level of the first signal is different from a level of the second signal, and output a low level when a level of the first signal is the same as a level of the second signal; a low level output circuit configured to output the second output signal; and a comparison circuit configured to compare the phase of the first signal and the phase of the second signal, in the case that the phase of the first signal is ahead of the phase of the second signal, cause an output of the XOR operation circuit to be input to the average determination circuit, and in the case that the phase of the first signal lags behind the phase of the second signal, cause an output of the low level output circuit to be input to the average determination circuit. Through the included XOR operation circuit, the low level output circuit and the comparison circuit, the case where the voltage is ahead of the current is distinguished from the further case where the voltage lags behind the current and thus different signals for two cases can be input to the average determination circuit.

In some embodiments, the logic operation circuit includes: an XOR operation circuit configured to receive the first signal and the second signal to output the first output signal, output a high level when a level of the first signal is different from a level of the second signal, and output a low level when the level of the first signal is the same as the level of the second signal; a trigger circuit configured to receive the first output signal, output a high level in the case that the phase of the first signal is ahead of the phase of the second signal, and output a low level in the case that the phase of the first signal lags behind the phase of the second signal; and an AND gate operation circuit configured to receive a first output of the XOR operation circuit and a second output of the trigger circuit, perform an AND operation between the first output and the second output, and output a result of the operation to the average determination circuit. In this embodiment, the case where the voltage is ahead of the current is distinguished from the further case where the voltage lags behind the current through simple and cheap isolation devices rather than an integrated circuit, and different results are output for various cases.

In some embodiments, the logic operation circuit also includes: a delay circuit connected between the trigger circuit and the first signal acquisition circuit. By including the delay circuit, it is ensured that the trigger circuit can gather the desired signal and output different signals for the case where the voltage is ahead of the current and the further case where the voltage lags behind the current.

In some embodiments, the first signal acquisition circuit is connected to a drive circuit of the inverter switch, to obtain a drive voltage of the inverter switch as the first signal. According to this connection, an accurate digital logic signal related to the phase of the output voltage of the inverter circuit can be directly and conveniently obtained from the drive circuit, so as to compare the phases of the output current and the output voltage.

In some embodiments, the first signal acquisition circuit includes: a voltage sensor configured to sample the output voltage of the inverter circuit to obtain a sampled voltage; and a first zero-crossing comparator configured to compare the sampled voltage with the zero voltage to obtain the first signal. When the voltage sensor and the zero-crossing comparator are provided, an accurate digital logic signal related to the phase of the output voltage of the inverter circuit can be obtained in a further simple way, so as to compare the phases of the output current and the output voltage.

In some embodiments, the second signal acquisition circuit includes: a current sensor configured to sample the output current of the inverter circuit to obtain a sampled current; and a second zero-crossing comparator configured to compare the sampled current with the zero current to obtain the second signal. When the current sensor and the zero-crossing comparator are provided, the digital logic signals related to the phase of the output current can be obtained in a simple manner, to facilitate comparing the phase of the output current with the phase of the output voltage.

In a second aspect of the present disclosure, there is provided an electrical device including the switching frequency adjusting circuit according to the first aspect of the present disclosure.

It should be appreciated that the contents described in this Summary are not intended to identify key or essential features of the embodiments of the present disclosure or limit the scope of the present disclosure. Other features of the present disclosure will be understood more easily through the following description.

BRIEF DESCRIPTION OF THE DRAWINGS

Through the following detailed description with reference to the accompanying drawings, the above and other features, advantages and aspects of various embodiments of the present disclosure will become more apparent. In the drawings, same or similar reference signs may indicate same or similar elements, wherein.

DETAILED DESCRIPTION

Figure 1A:
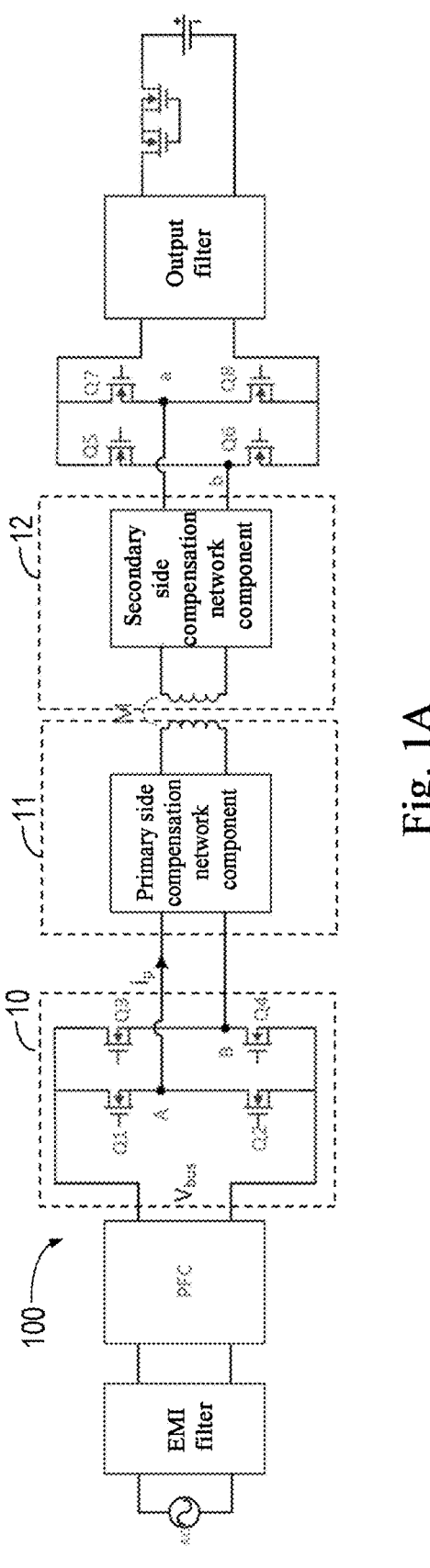
FIG. 1A illustrates a schematic diagram of an example environment in which some embodiments of the present disclosure can be implemented.

Various embodiments are now described with reference to the drawings. Throughout the text, similar reference signs indicate similar elements. In the following description, many specific details are illustrated for explanatory purpose to enable a thorough understanding of one or more embodiments. However, it should be clear that any embodiments described below may be implemented without adopting the following specific design details in some or all cases. In other embodiments, known structures and devices are illustrated in block diagrams to describe one or more embodiments. One or more embodiments are summarized below to give a basic understanding of the embodiments. The summary does not describe all expected embodiments in exhaustive style, nor does it aim to identify key or vital elements of all embodiments or define the scope of any or all embodiments.

References to "an embodiment" or "one embodiment" in the framework described here intend to indicate that specific configurations, structures or characteristics described for the embodiment are included in at least one embodiment. Therefore, the terms, like "in this embodiment" or "in one embodiment", present in one or more points described here may not indicate the same embodiment. Besides, in one or more embodiments, specific constructions, structures or characteristics may be combined in any suitable manners.

Unless indicated otherwise, when it is stated that two elements are connected together, it means that the two elements are directly connected without any intermediate components other than the conductor; and when it is stated that two elements are coupled together, it means that the two elements may be connected or they may be coupled via one or more other elements.

In the following disclosure, unless indicated otherwise, the modifications for absolute positions (e.g., terms "front", "rear", "top", "bottom", "left" and "right" etc.) or the modifications for relative positions (e.g., terms "above", "below", "higher" and "lower" etc.) or the modifications for orientations (such as "horizontal" and "vertical" etc.) refer to the directions shown in the drawings. The expressions, including "about", "approximately", "basically" and "around" indicate a range of within 10%, preferably within 5% unless indicated otherwise.

In the following description, one or more specific details are provided to thoroughly understand the examples of the embodiments described herein. The embodiments may be obtained by other methods, components and materials without disclosing one or more specific details. In other situations, the known structures, materials or operations are not illustrated or described in detail, to avoid obscuring some aspects of the embodiments.

Throughout the drawings attached, same components or elements are indicated by the same reference signs and the corresponding description will not be repeated for conciseness. The reference signs used in the present disclosure are provided only for the sake of convenience, rather than defining the protection scope or the scope of the embodiments.

Example Environment

Figure 1B:
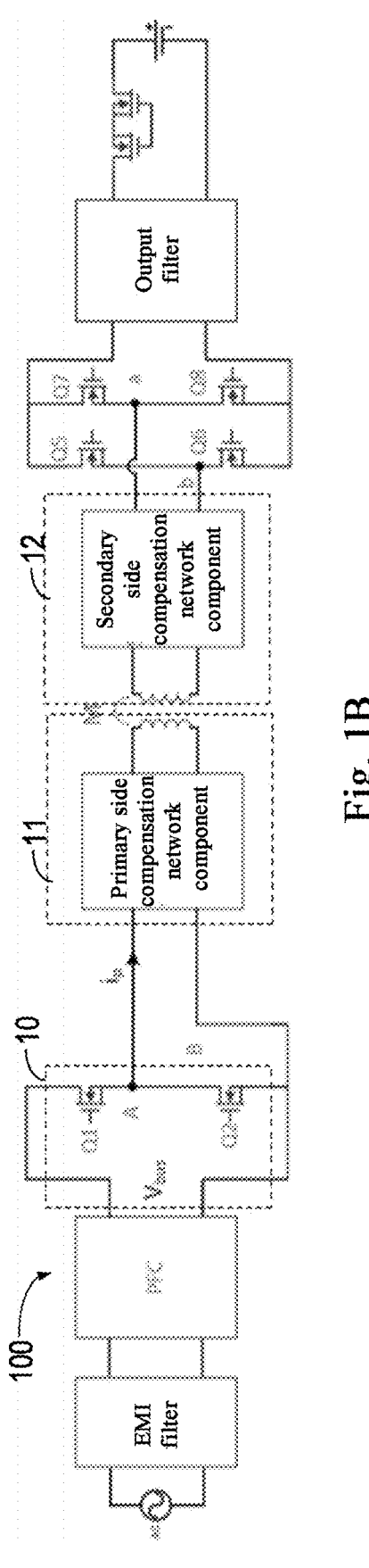
FIG. 1B illustrates a schematic diagram of an example environment in which some embodiments of the present disclosure can be implemented.

FIGS. 1A and 1B illustrate a schematic diagram of a wireless charger 100 to which the switching frequency adjusting circuit according to the present disclosure is adapted, wherein FIG. 1A shows a full bridge inverter and FIG. 1B demonstrates a half bridge inverter. It should be understood that the quantity and the type of the circuit components included in the wireless charger as illustrated by FIGS. 1A and 1B are only exemplary and non-restrictive.

According to FIGS. 1A and 1B, the wireless charger 100 may be a high-power wireless charger for Automatic Guided Vehicle (AGV) and Electric Vehicle (EV). The wireless charger 100 includes a transformer including a primary side coil (also known as transmitting end) and a secondary side coil (also referred to as receiving end). Due to a wide distance between the transmitting end and the receiving end, the transformer has a loose coupling and a large leakage inductance. The reactive power is therefore quite large. In order to boost the charging efficiency, a compensation network should be used, wherein the compensation network typically operates at a given resonant frequency. As illustrated in FIGS. 1A and 1B, a primary side compensation network 11 includes primary side compensation network components and primary side windings of the transformer, while a secondary side compensation network 12 includes secondary side compensation network components and secondary side windings of the transformer.

In theory, the resonant frequency of the compensation network can be determined once the parameters of the inductor and the capacitor are determined. In the case that the full bridge or half bridge inverter 10 operates under the resonant frequency of the compensation network, the reactive power is small, i.e., the reactive loss is relatively small. Accordingly, it is required to enable the ON-frequency and OFF-frequency of the switch (i.e., switching frequency) in the full bridge or half bridge inverter 10 to be close to the resonant frequency of the compensation network as much as possible.

However, in practical applications, inductance and capacitance of the compensation network and self-inductance at primary and secondary sides of the transformer with loose coupling could not remain consistent among different production batches. In such case, tolerance exists in the above parameters. For example, the capacitance has an error of ±5%, and the inductance and the self-inductance respectively have an error of ±10%. A further important influencing factor is described below. In the case that a distance between two coil pads (the primary and secondary sides of the transformer of the wireless charger are formed in the form of pads, and energy is delivered through coupling of the magnetic fields) varies from one transformer to another transformer, their self-inductances are affected. The resonant frequency is set in accordance with nominal values of the inductance and the capacitance, but the resonant frequency in the actual charger may greatly deviate from the calculated theoretical resonant frequency. Since the inverter fails to operate under the calculated resonant frequency, the charger could not work in the optimal state. In such case, instead of calculating the theoretical resonant frequency in accordance with the fixed capacitance and inductance values, it is required to identify the actual resonant frequency of the compensation network online, to control ON and OFF of the switch in the inverter 10 based on the actual resonant frequency.

Besides, another operating parameter of interest is whether the switch is working in a soft switching state (e.g., Zero Voltage Switching (ZVS) and Zero Current Switching (ZCS)). In the case that the full bridge or half bridge inverter 10 operates at the resonant frequency of the compensation network, the switch (e.g., as indicated by Q1 to Q4 in FIG. 1A or Q1 and Q2 in FIG. 1B) of the inverter operates in a hard switching state in spite of the small reactive power. Accordingly, the switching loss is high and the total loss is also huge.

The so-called hard switching indicates that the switch is switched on or off compulsorily despite of the voltage or current over the switch. In case of large voltage and current on the switch (between drain and source electrodes, or between collector and emitter), the switch is switched. Since it takes a given time to switch (from ON to OFF, or from OFF to ON) between the states of the switch, a crossover area of the voltage and the current may exist during a period of time of the switchover of the switch. The switching loss (switching loss of the switch) induced by the crossover may rapidly increase as the switching frequency goes up.

For example, if the load is inductive, it may sense a peak voltage when the switching transistor is switched off. As the switching frequency increases, the switch-off is performed more rapidly and the inductive voltage is higher. When the voltage is applied to both ends of the switching devices, it may easily cause breakdown of the device. if the load is capacitive, the peak current is huge when the switching transistor is switched on. Accordingly, when the switching transistor is switched on under a quite high voltage, the energy stored in the capacitor of the switching transistor is fully dissipated within the device in the form of currents. The peak of the switching-on current increases as the frequency goes up, which may further lead to overheat damage of the switch.

Contrary to the hard switching, the so-called soft switching includes ZVS, which means that the voltage on the switch must be in the zero-voltage state when the switch is about to be switched on or switched off. Accordingly, the cross-voltage of the switch would not cross over the current and further cause damages. Therefore, the switches of the inverter are further required to implement ZVS, thereby minimizing the switching loss.

In view of the above problems, the present disclosure proposes a switching frequency adjusting circuit, which can detect output voltage and output current of the high-frequency full bridge or half bridge inverter to determine the resonant frequency of the compensation network online. The switching frequency of the inverter switch is gradually adjusted to be close to the actually identified resonant frequency, and the ZVS of the inverter switch is also implemented.

Although it has been described above that the switching frequency adjusting circuit according to the present disclosure adapts to the wireless charger, the present disclosure is not limited to this. Instead, the present disclosure is intended to encompass all electrical devices that are required to adjust ON and OFF frequency of the switch.

Example Circuit Structure

Figure 2:
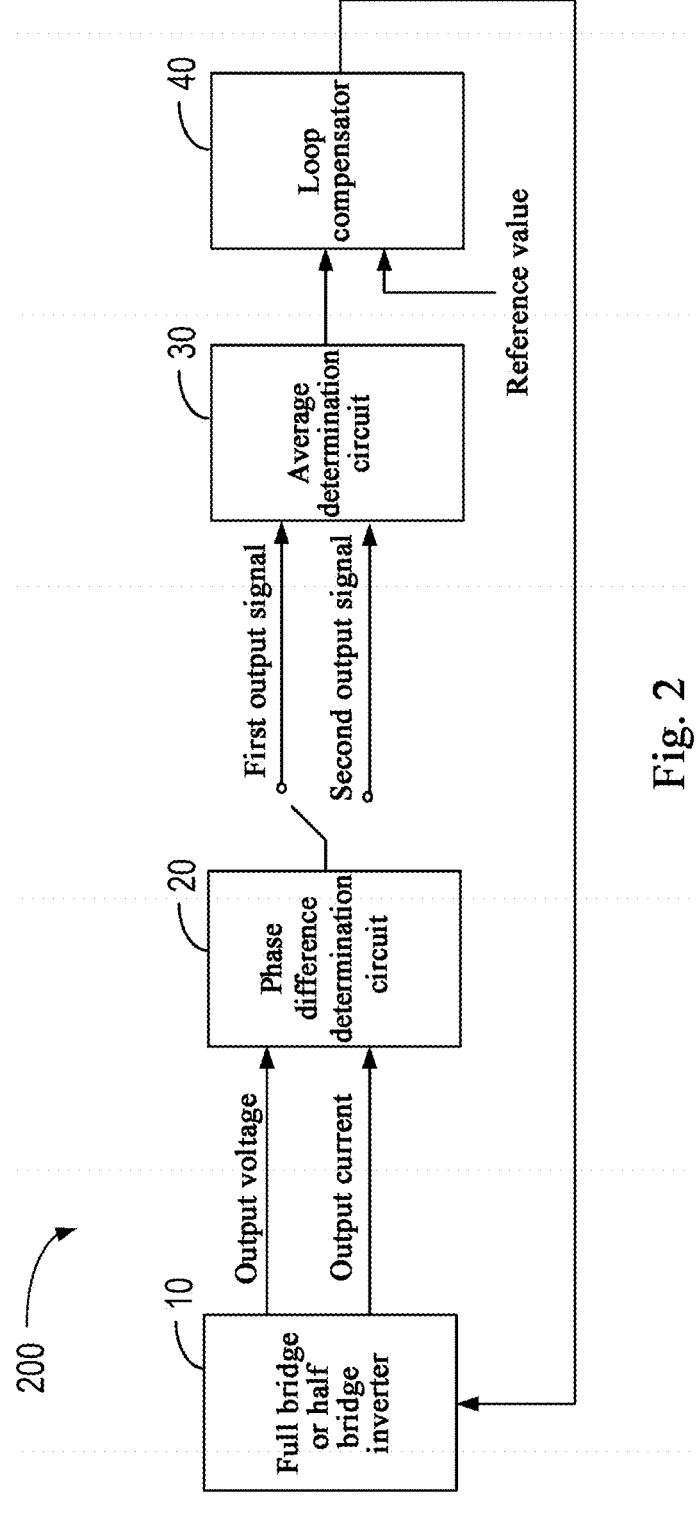
FIG. 2 illustrates a schematic block diagram of a switching frequency adjusting circuit in accordance with some embodiments of the present disclosure.

FIG. 2 illustrates a schematic block diagram of the switching frequency adjusting circuit 200 in accordance with embodiments of the present disclosure.

As shown in FIG. 2, the switching frequency adjusting circuit 200 includes an inverter circuit 10, wherein the inverter circuit 10 includes inverter switches, e.g., switches Q1 to Q4 shown by FIG. 1A and switches Q1 and Q2 illustrated by FIG. 1B. These switches may be switched on and off at a given switching frequency. As stated above, when the full bridge or half bridge inverter 10 operates at the resonant frequency of the compensation network, the reactive power is relatively small, i.e., the reactive power loss is also small. Therefore, it is required to enable the ON-frequency and OFF-frequency of the switch (i.e., switching frequency) in the full bridge or half bridge inverter 10 to be close to the resonant frequency of the compensation network as much as possible. However, the resonant frequency of the compensation network should be the resonant frequency identified online, rather than a theoretical one determined from the nominal values of the capacitance and inductance. Due to the manufacturing tolerance of the capacitance and inductance, the theoretical resonant frequency determined according to the nominal values widely differs from the resonant frequency in actual circuits.

According to FIG. 2, the switching frequency adjusting circuit 200 also includes a phase difference determination circuit 20, wherein the phase difference refers to a difference of phase between the phase of the output voltage and the phase of the output current of the inverter circuit 10. The phase difference determination circuit 20 is connected to the inverter circuit 10, to obtain the first signal associated with the output voltage of the inverter circuit 10 and the second signal associated with the output current of the inverter circuit 10. The phase difference determination circuit 20 also compares the phase of the first signal with the phase of the second signal to obtain a phase relation there between. The phase difference determination circuit 20 further selectively outputs the first output signal and the second output signal according to the phase comparison result, where the first output signal is related to the phase difference between the first signal and the second signal and the second output signal is associated with a fixed value. In one example, the fixed value associated with the second output signal may be zero, also may be other values in view of the design needs.

In one example, the first output signal is also related to the case where the phase of the output voltage signal is ahead of the phase of the output current signal of the inverter circuit 10, while the second output signal is associated with the case where the phase of the output voltage signal of the inverter circuit 10 lags behind the phase of the output current signal. However, in a further example, the first output signal also may indicate the scenario where the phase of the output voltage signal lags behind the phase of the output current signal of the inverter circuit 10, and the second output signal also may indicate the scenario where the phase of the output voltage signal of the inverter circuit 10 is ahead of the phase of the output current signal. Accordingly, the phase difference determination circuit 20 may selectively output the first output signal or the second output signal to indicate that the phase of the output voltage is ahead of or lags behind that of the output current. Then, different intermediate values are assigned to the first output signal and the second output signal. Accordingly, when the intermediate values are input to a subsequent average determination circuit, different results for the average value can be obtained, to distinguish that the phase of the output voltage is before or after the phase of the output current. Therefore, the switching frequency may be respectively adjusted for different situations in a more pertinent way. For example, the switching frequency may increase or decrease.

In one embodiment, both the first signal and the second signal are digital logic signals. In one example, the digital logic signal of the first signal may be obtained from comparing the output voltage in analog signal form with the zero voltage. For example, if the output voltage is higher than the zero voltage, the obtained logic signal is at a high level (e.g., 1); if the output voltage is below the zero voltage, the obtained logic signal is at a low level (e.g., 0). In a similar way, the digital logic signal of the second signal may be obtained. In this embodiment, a phase difference between the first signal and the second signal may be indicated by the logic signal. For example, when the first signal and the second signal in the digital logic signal form have different levels, the logic signal for the phase difference is valued to a high level (e.g., the high level value being 1). However, when the first signal and the second signal have the same level, the logic signal for the phase difference is valued to a low level (for example, the low level value being 0). However, those skilled in the art should understand that the values of the logic signal should not be limited to 1 and 0 and the values may be provided in an inverse manner as long as they can indicate similarities and differences between the first signal and the second signal. Although the logic signal is obtained by comparing the voltage with the zero voltage as described above, those skilled in the art should understand that the first signal and the second signal in the logic signal form should also be obtained in other ways.

Although it has been explained that the first signal and the second signal may be represented by digital logic signal, those skilled in the art should understand that the analog signals of the sampled voltage and current may also be used to indicate the first signal and the second signal. Accordingly, in a further embodiment, the first signal and the second signal may be analog signals of the sampled voltage and current. The phase relation between the first signal and the second signal may also be obtained through the analog signal. For example, the phase relation between the first signal and the second signal may be obtained by detecting the phases of the first signal and the second signal when they pass through the same amplitude (e.g., phase of the analog signal at the Zero Crossing Point). In this embodiment, to indicate the relation between phases, when one of the two analog signals is greater than zero and the other is smaller than zero at the same moment, it is deemed that the two signals have different phases, and vice versa. The manifestations of the first signal and the second signal are not restricted in the present disclosure as long as the phase relation between the two signals can be obtained.

The basic requirement of the compensation network is to minimize the reactive power (i.e., reactive power output by the inverter) of the input source. The input of the primary side compensation network is usually generated by the high-frequency full bridge or half bridge inverter 10, and the output voltage of the high-frequency full bridge or half bridge inverter 10 is alternating high frequency voltage. The primary side compensation network (or secondary side compensation network) mainly includes inductors and capacitors. Besides, the compensation network compensates the inductance of the secondary coil at the secondary side to increase the transmission power. When the fundamental frequency of the input voltage of the compensation network is equal to the resonant frequency collectively formed by the components of the compensation network and the windings of the transformer, the input resistance is pure resistive. Accordingly, the input voltage (i.e., output voltage of the inverter circuit 10) and the input current (i.e., output current of the inverter circuit 10) of the compensation network have the same phase. The reactive power is thus eliminated. To reduce the reactive power of the circuit, the phase difference between the output voltage and the output current of the inverter circuit 10 may be kept as minimal as possible.

As shown in FIG. 2, the switching frequency adjusting circuit 200 also includes the average determination circuit 30, which can be configured to determine a first average value of the first output signal. Since the second output signal is a fixed value, its average value is also this fixed value. In one example, the fixed value is preferably 0. In one example, the average determination circuit 30 can be a low-pass filter. The pulse signal or square signal of the first output signal can be filtered to DC currents by the average determination circuit. For example, if the pulse signal of the first output signal has a duty cycle of 10%, the determined DC signal may have an amplitude of 0.1; in the case that the duty cycle of the pulse signal is 20%, the amplitude of the determined DC signal may be 0.2. When the similarities and differences between the first signal and the second signal are indicated by digital logic signals, the above duty cycle may be related to the ratio of the period of time when the output voltage and the output current of the inverter circuit 10 have different phases to the entire cycle.

Figure 3:
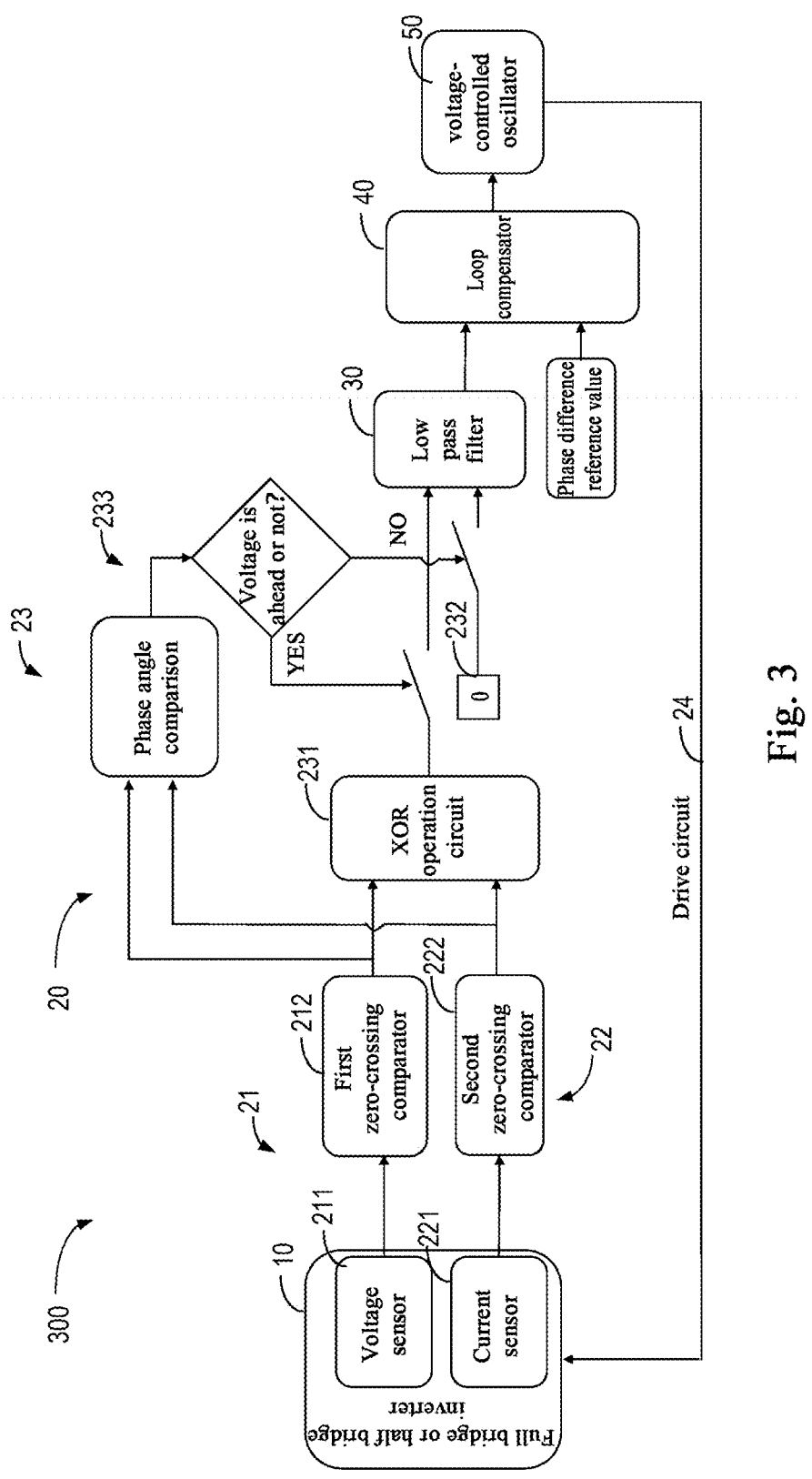
FIG. 3 illustrates a schematic diagram of the switching frequency adjusting circuit in accordance with some embodiments of the present disclosure.

As shown in FIG. 2, the switching frequency adjusting circuit 200 also includes a loop compensator 40, which can compare the determined average value with a reference value and adjust the ON and OFF frequency of the switch in the inverter circuit 10 based on the comparison results. The reference value is determined according to the phase difference required for implementing the switches of the inverter as soft switching. Therefore, the calculated average value is compared with the reference value, and the switching frequency of the switches of the inverter is gradually adjusted based on the comparison results, so as to progressively implement the ZVS of the switches of the inverter. Specifically, as shown in FIG. 3, the switching frequency of the switches of the inverter 10 is adjusted by a voltage-controlled oscillator 50. For the voltage-controlled oscillator, its input voltage and oscillation frequency are basically in a linear relation. The loop compensator 40 outputs a voltage, which is input to the voltage-controlled oscillator 50, and then the voltage-controlled oscillator 50 can adjust the switching frequency of the inverter switch 10 in accordance with the voltage and provide a digital drive signal having the switching frequency to the full bridge or half bridge inverter 10 as feedback. Specifically, the digital drive signal is fed back to the full bridge or half bridge inverter 10 via a drive circuit 24 (as shown in FIG. 3).

Therefore, to address the hard switching problem, some resonant elements are adjusted to make the input resistance of the compensation network a bit sensitive (slightly sensitive). Such characteristic may enable the switch (such as Q1 to Q4 in FIG. 1A and Q1 and Q2 in FIG. 1B) in the full bridge or half bridge inverter 10 to implement soft switching (ZVS). Although in comparison to the scenario where the voltage and the current have the same phase, the reactive power increases a little when the output voltage and the output current of the inverter circuit have different phases (i.e., input current and input voltage of the compensation network have different phases), the inverter switch implements the ZVS and a greater reduction is achieved in total loss.

Besides, to ensure that the inverter circuit 10 operates at a frequency near the resonant frequency of the compensation network, the reference value should not be too large because a relatively large reference value may indicate a wide phase difference between the output voltage and the output current of the inverter circuit 10 (i.e., a greater phase difference between the input current and the output current of the compensation network). The reactive power is therefore large. For example, in one embodiment, in the case that the logic signal of the first output signal has a value of 1 and 0, and the logic value of the second output signal is 0, the reference value may be in a range greater than 0 and smaller than 0.1. Preferably, the reference value may be around 0.05.

A relatively small reference value indicates a small phase difference between the output voltage and the output current of the inverter circuit 10. Thus, through the phase difference determination circuit 20, the average determination circuit 30, the loop compensator 40 and appropriately selected reference values of the present disclosure, the ZVS of the switches of the inverter circuit 10 can be implemented while the switching frequency of the inverter circuit 10 is made close to the resonant frequency of the compensation network.

Besides, when the current or voltage is compared with the zero value, the comparison result may oscillate between high voltage and low voltage due to error or noise factors, causing interference. The interference may be filtered through the average determination circuit 30 (e.g., low pass filter) and the loop compensator 40, so as to filter the impulse signal into a DC signal.

Besides, when the DC signal is input to the loop compensator 40, the loop compensator 40 may only adjust the switching frequency for one time within a long period of time. The switching frequency therefore is not adjusted frequently. For example, if the target switching frequency is 100 kHz (i.e., a cycle of 10 μs), the loop compensator 40 may adjust the switching frequency for one time within one second or even several seconds, rather than frequently adjusting the switching frequency within a short period. Accordingly, the functionality and the service life of the circuit would not be greatly affected.

Therefore, the phase difference between the two signals can be obtained via the above switching frequency adjusting circuit 200 through detecting the first signal and the second signal respectively related to the output voltage and the output current of the inverter circuit 10. Besides, since the target phase difference reference value is related to the ZVS of the inverter switches, the switching frequency of the inverter switch can be adjusted based on the comparison result between the phase difference and the target phase difference reference value. Therefore, the ZVS of the inverter switch can at least be implemented and the switching loss is also reduced. Besides, the target phase difference reference value may be set small, such that the phase difference between the output voltage and the output current of the inverter circuit 10 is as small as possible, i.e., the phases of the input current and the output current of the compensation network are as close as possible. Hence, the resonant frequency (i.e., frequency when the input current and the output current of the compensation network have the same phase) of the compensation network can be identified online, the switching frequency of the inverter switch is made close to the resonant frequency as much as possible, and the reactive power is reduced and even eliminated while the ZVS or ACS of the inverter switch is implemented.

Figure 4:
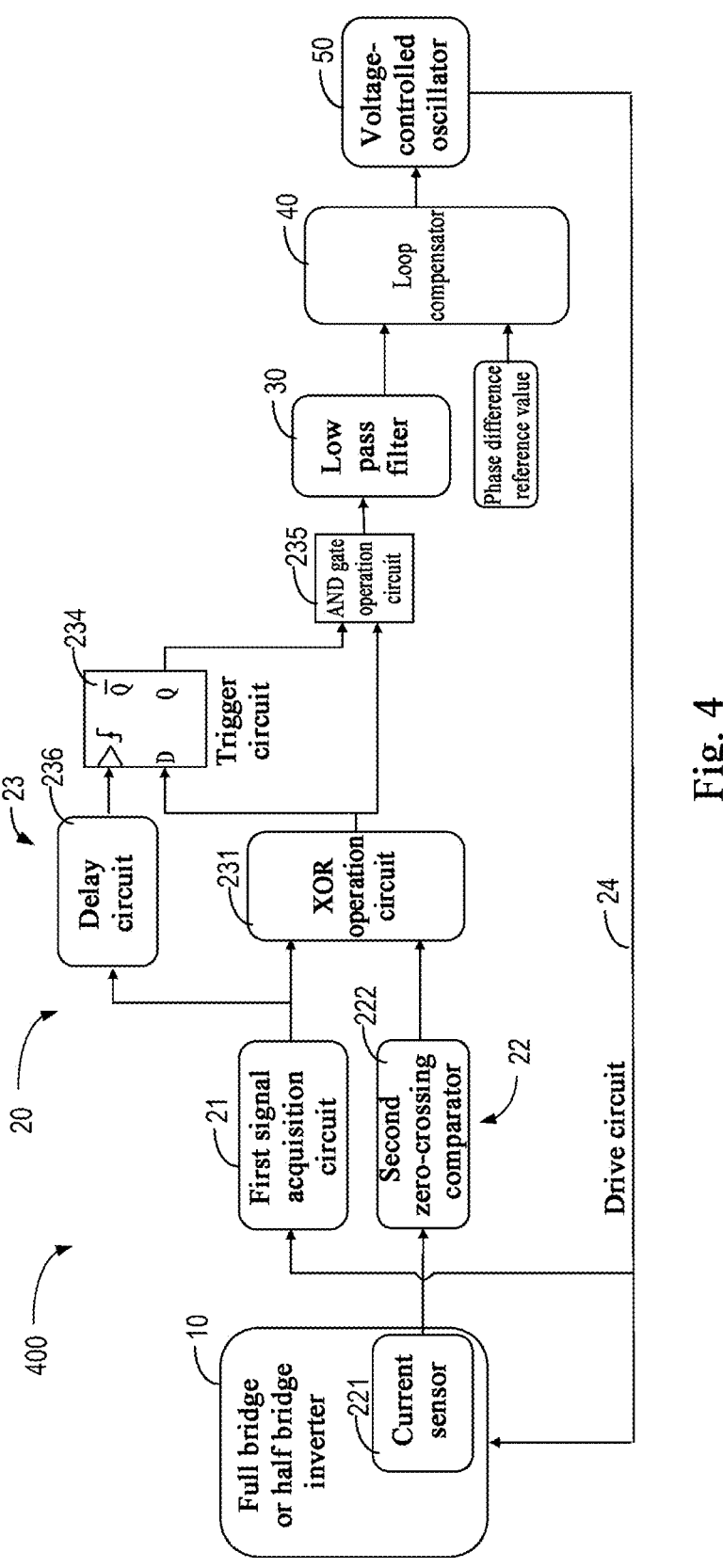
FIG. 4 illustrates a schematic diagram of the switching frequency adjusting circuit in accordance with some embodiments of the present disclosure.
Figure 5:
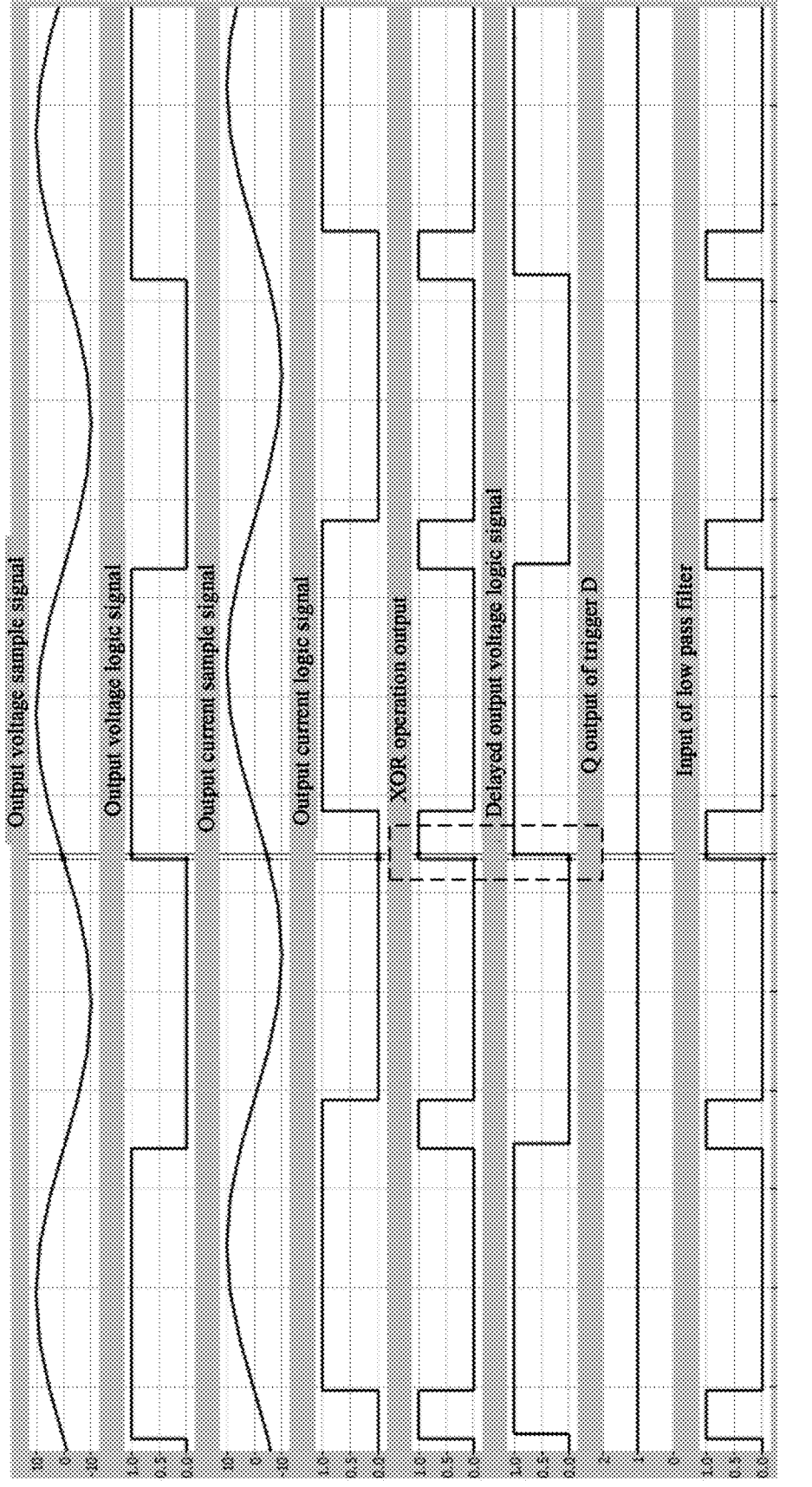
FIG. 5 illustrates a signal sequence diagram when the switching frequency adjusting circuit of FIG. 4 is adopted and its voltage phase is ahead of the current phase in accordance with some embodiments of the present disclosure.
Figure 6:
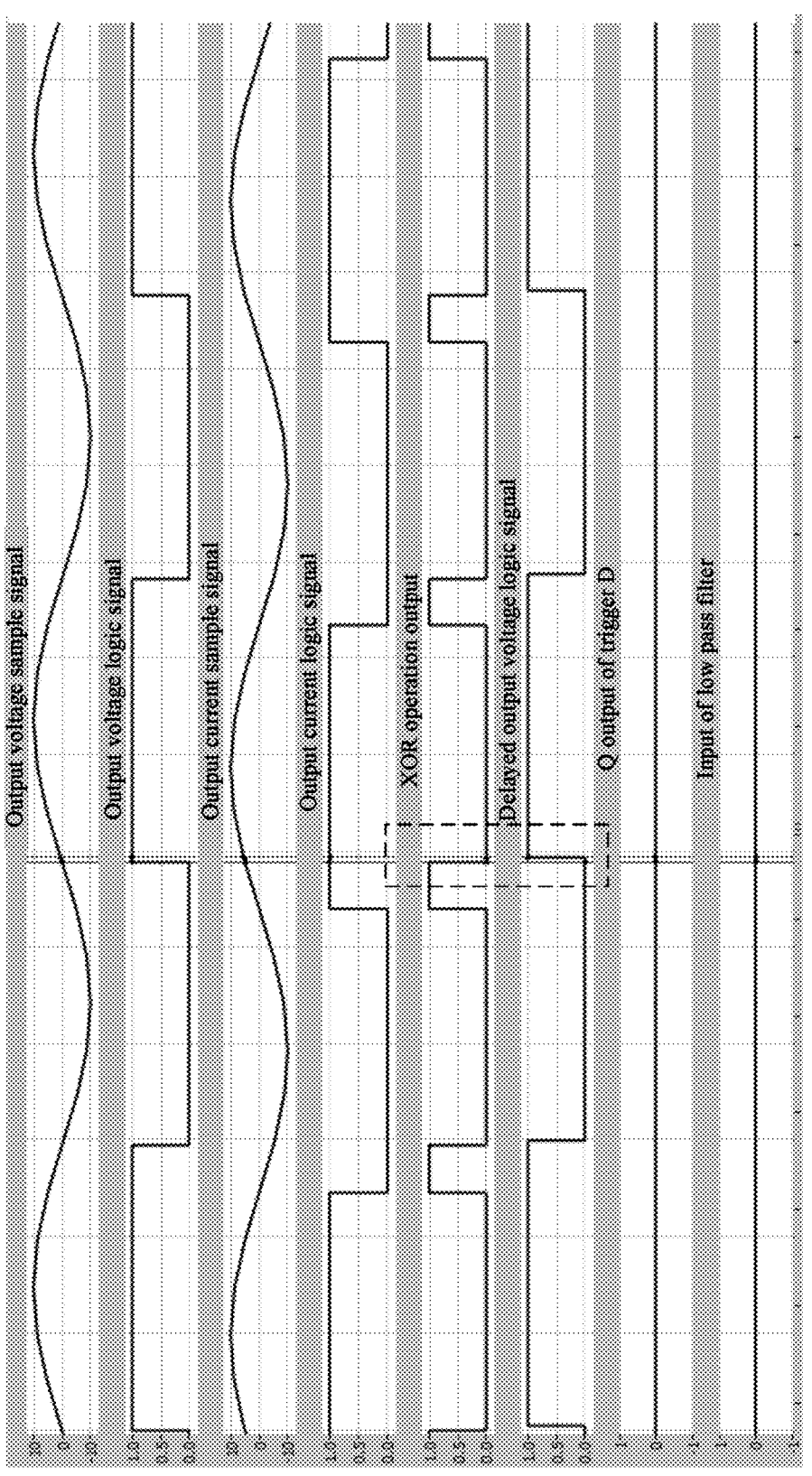
FIG. 6 illustrates a signal sequence diagram when the switching frequency adjusting circuit of FIG. 4 is adopted and its voltage phase lags behind the current phase in accordance with some embodiments of the present disclosure.

To explain the switching frequency adjusting circuit in accordance with some embodiments of the present disclosure in a more detailed manner, the detailed description is provided below with reference to FIGS. 3 to 6. FIG. 3 illustrates a schematic diagram of the switching frequency adjusting circuit 300 in accordance with some embodiments of the present disclosure; FIG. 4 demonstrates a schematic diagram of the switching frequency adjusting circuit 400 in accordance with some embodiments of the present disclosure; FIG. 5 illustrates a signal sequence diagram when the switching frequency adjusting circuit of FIG. 4 is adopted and its voltage phase is ahead of the current phase in accordance with some embodiments of the present disclosure; and FIG. 6 illustrates a signal sequence diagram when the switching frequency adjusting circuit of FIG. 4 is adopted and its voltage phase lags behind the current phase in accordance with some embodiments of the present disclosure.

As shown in FIG. 3, the phase difference determination circuit 20 includes a first signal acquisition circuit 21, a second signal acquisition circuit 22 and a logic operation circuit 23. The first signal acquisition circuit 21 is used for comparing the output voltage of the inverter circuit 10 with the zero voltage to obtain the first signal, where the first signal is digital logic signal. The second signal acquisition circuit 22 is provided for comparing the output current of the inverter circuit 10 with the zero current to obtain the second signal, wherein the second signal is digital logic signal. According to FIG. 3, correspondingly, the first signal acquisition circuit 21 includes a voltage sensor 211 and a zero-crossing comparator 212, and the second signal acquisition circuit 22 includes a current sensor 221 and a second zero-crossing comparator 222.

In an alternative embodiment, as shown in FIG. 4, the voltage sensor 211 and the first zero-crossing comparator 212 may be omitted and the first signal acquisition circuit 21 is directly connected to a drive circuit 24 of the inverter circuit 10 to obtain a phase of the output voltage of the inverter circuit 10. Because the drive voltage of a given switch of the inverter 10 has the same phase with the output voltage of the inverter circuit 10, the drive signal may be directly obtained as the first signal. Therefore, the complex voltage sensor may be omitted and the low voltage drive signal is not required to be converted into a high voltage signal, and then the high voltage signal is not required to be converted into low voltage signal, and there is also no need for sampling the signal with the sensor.

By including the zero-crossing comparator, the digital logic signal can be obtained in a simple and practical way. It should be noted that other common methods for obtaining the digital logic signal in the art are also included within the scope of the present disclosure.

As shown in FIGS. 3 and 4, the logic operation circuit 23 may compare the first signal with the second signal, so as to output the first output signal when the phase of the first signal is ahead of the phase of the second signal, and output the second output signal in the case that the phase of the first signal lags behind the phase of the second signal. However, those skilled in the art should understand that it is also feasible the other way around. That is, the first output signal is associated with the case where the phase of the first signal lags behind the phase of the second signal, while the second output signal is related to the case where the phase of the first signal is ahead of the phase of the second signal. The logic operation circuit 23 may output signals in various forms as long as it can be distinguished that the first signal is ahead of or lags behind the second signal.

The components constituting the logic operation circuit 23 are to be described below in detail. According to FIG. 3, the logic operation circuit 23 includes an XOR operation circuit 231, a low level output circuit 232 and a comparison circuit 223. The XOR operation circuit 231 receives output voltage and output current of the inverter circuit 10 in the form of digital logic signal, outputs the high level when the level of the digital logic signal for the output voltage is different from the level of the digital logic signal for the output current, and outputs the low level in the case that the digital logic signal for the output voltage and the digital logic signal for the output current are at the same level, as clearly indicated in FIG. 5.

As shown in FIG. 3, the low level output circuit 232 may constantly output the low level, e.g., the low level in the digital logic signal (e.g., the low level value is 0). Besides, as shown in FIG. 3, the comparison circuit 233 can compare the phase of the first signal with the phase of the second signal. When the phase of the first signal is ahead of the phase of the second signal, the XOR operation circuit 231 is connected to the average determination circuit 30 (i.e., output the first output signal), and in the case that the phase of the first signal lags behind the phase of the second signal, the low level output circuit 232 is connected to the average determination circuit 30 (i.e., output the second output signal).

According to FIG. 3, the comparison circuit 233 can be implemented by micro-control unit (MCU) or Digital Signal Processor (DSP), which MCU or DSP can easily identify the phase relation between the input current and the input voltage. For example, the MCU or DSP determines the phase relation by capturing the rising edge of the voltage and current logic signals. After the phase relation is identified by the MCU or DSP, two switching signals are output from the MCU or DSP. For example, when the voltage is ahead of the current, the output value of the XOR operation circuit is selected; however, if the voltage lags behind the current, the output value of the low level output circuit 232 is selected (e.g., 0).

In an alternative embodiment, the above logic operation function can be implemented by cheap non-integrated electronic elements. According to FIG. 4, the logic operation circuit 23 includes the XOR operation circuit 231, which is similar to the XOR operation circuit described above with reference to FIG. 3 and will not be repeated here.

According to FIG. 4, the logic operation circuit 23 also includes a trigger circuit 234, e.g., trigger D. The trigger circuit 234 receives the output of the XOR operation circuit 231, and outputs the high level (which is the Q output of the trigger D, clearly indicated in FIG. 5, e.g., high level 1) when the voltage is ahead of the current as shown in FIG. 5, and outputs the low level (which is the Q output of the trigger D, clearly indicated in FIG. 6, e.g., low level 0) when the voltage lags behind the current as shown in FIG. 6.

As shown in FIG. 4, the logic operation circuit 23 also includes AND gate operation circuit 235, which receives the output of the XOR operation circuit 231 and the output of the trigger circuit 234, performs the AND operation on the two outputs and outputs the operation results to the average determination circuit 30. As illustrated in FIG. 5, when the voltage is ahead of the current, the output of the trigger circuit 234 is at high level, and thus the operation results from the AND gate multiplication operation is the same as the output of the XOR operation circuit 231. As shown in FIG. 6, when the voltage lags behind the current, the output of the trigger circuit 234 is at low level and thus the operation result of the AND operation of the AND gate is also low level.

When the voltage is ahead of the current as shown in FIG. 5, the output of the trigger D 234 is at high level, the output of the XOR operation circuit 231 can be input to the average determination circuit 30 (for example, the low-pass filter) via the AND gate operation circuit 235 to determine its average value (the average value is associated with the size of the duty cycle). When the voltage lags behind the current as shown in FIG. 6, by receiving a low level output (i.e. a low level, 0) of the trigger D 234, the AND gate operation circuit 235 outputs the low level to the average determination circuit 30 and the resulting average value is also at a low level, e.g., 0. That is, when the voltage lags behind the current, the output having high level and low level of the XOR operation circuit 231 is not input to the average determination circuit 30 and the determined average value is 0.

In the case that the voltage is ahead of the current, if the average value (e.g., 0.2) determined by the average determination circuit 30 is above the certain phase difference reference value (such as 0.05), it indicates that the voltage is ahead of the current too much and the switching frequency should be tuned down to be close to the resonant frequency, such that the phase difference between the voltage and the current is narrowed down. When the voltage lags behind the current and the average value determined by the average determination circuit 30 is 0 and smaller than the given phase difference reference value (such as 0.05), it indicates that the voltage lags behind the current too much and the switching frequency should be tuned up to be close to the resonant frequency, such that the phase difference between the voltage and the current is narrowed down. Accordingly, the phases of the voltage and the current are kept to be as close as possible but not completely identical. When the phase difference is kept at a given level, the inverter switch may implement the ZVS and can simultaneously operate at a frequency near the resonant frequency of the compensation network.

As shown in FIG. 4, the logic operation circuit 23 also includes a delay circuit 236, which can make the trigger signal of the trigger circuit 234 to be a bit delayed than the output result of the XOR operation circuit 231. That is to say, the output voltage logic signal or digital signal from the first signal acquisition circuit 21 can be delayed, such that the delayed output voltage logic signal lags behind the output result of the XOR operation circuit 231, as shown in FIG. 5 and FIG. 6.

For example, according to FIG. 5, as indicated by a rectangular block, the trigger circuit 234 can sample the high level after the rising edge of the output of the XOR operation circuit 231 through the delay circuit 236. The output of the trigger circuit 234 is then maintained at the high level. The trigger circuit 234 would not sample the rising edge of the output of the XOR operation circuit 231 or the low level before the rising edge through the delay circuit 236. Therefore, when the voltage is ahead of the current, the output of the trigger circuit 234 is constantly maintained at the high level and the subsequent output of the AND gate operation 235 may follow the output of the XOR operation circuit 231.

In addition, according to FIG. 6, as indicated by the rectangular block, the trigger circuit 234 can sample the low level after the falling edge of the output of the XOR operation circuit 231 through the delay circuit 236, and the output of the trigger circuit 234 is then maintained at the low level. The trigger circuit 234 would not sample the falling edge of the output of the XOR operation circuit 231 or the high level before the falling edge through the delay circuit 236. Therefore, when the voltage lags behind the current, the output of the trigger circuit 234 constantly maintains at the low level. The subsequent output of the AND operation 235 no longer follows the output of the XOR operation circuit 231 and instead maintains at the low level. The two situations where the voltage is ahead of the current and the voltage lags behind the current are distinguished as a result.

Without compromising the basic principle, details and embodiments may vary and even change greatly only with respect to the contents described only by examples. This does not deviate from the protection scope.

The above various embodiments may be combined to provide further embodiments. If the further embodiments are to be provided through concepts in various patents, applications and publications, the respective aspects of the embodiments may be modified.

These and other modifications may be made to the embodiments in accordance with the above description. Usually, in the following claims, the terms used here should not be interpreted as restricting the claims to particular embodiments disclosed in the description and claims. Instead, they should be understood to encompass all possible embodiments and all equivalents having these claims. Hence, the claims are not restricted by the disclosure.

We claim:

1. A switching frequency adjusting circuit, comprising:
    an inverter circuit comprising an inverter switch switched on and off at a switching frequency;
    a phase difference determination circuit connected to the inverter circuit and configured to obtain a first signal related to an output voltage of the inverter circuit and a second signal related to an output current of the inverter circuit, wherein the phase difference determination circuit is further configured to compare a phase of the first signal with a phase of the second signal, and selectively output a first output signal and a second output signal based on a result of the comparison, and wherein the first output signal is associated with a phase difference between the first signal and the second signal, and the second output signal is related to a fixed value;

an average determination circuit configured to determine a first average value of the first output signal and a second average value of the second output signal; and a loop compensator configured to compare the first average value or the second average value with a reference value and adjust the switching frequency of the inverter switch based on a result of the comparison, wherein the reference value is associated with a phase difference for implementing soft switching of the inverter switch.

2. The switching frequency adjusting circuit of claim 1, wherein:

the average determination circuit comprises a low pass filter, the first output signal comprises alternating high level and low level, the first average value is related to duty cycle of the high level and the low level, and the second average value is zero.

3. An electrical device comprising the switching frequency adjusting circuit according to claim 1.

4. The switching frequency adjusting circuit of claim 1, wherein the phase difference determination circuit comprises:

a first signal acquisition circuit configured to compare the output voltage of the inverter circuit with a zero voltage to obtain the first signal;

a second signal acquisition circuit configured to compare the output current of the inverter circuit with a zero current to obtain the second signal; and a logic operation circuit configured to compare the first signal with the second signal, output the first output signal in response to the phase of the first signal leading the phase of the second signal, and output the second output signal in response to the phase of the first signal lagging the phase of the second signal.

5. The switching frequency adjusting circuit of claim 4, wherein the logic operation circuit comprises:

an exclusive or (XOR) operation circuit configured to receive the first signal and the second signal, output a high level in response to a level of the first signal being different from a level of the second signal, and output a low level in response to the level of the first signal being the same as the level of the second signal;

a low level output circuit configured to output the second output signal; and a comparison circuit configured to compare the phase of the first signal and the phase of the second signal, and in response to the phase of the first signal leading the phase of the second signal, cause an output of the XOR operation circuit to be input to the average determination circuit, and in response to the phase of the first signal lagging the phase of the second signal, cause an output of the low level output circuit to be input to the average determination circuit.

6. The switching frequency adjusting circuit of claim 4, wherein the logic operation circuit comprises:

an exclusive or (XOR) operation circuit configured to receive the first signal and the second signal to output the first output signal, output a high level in response to a level of the first signal being different from a level of the second signal, and output a low level in response to the level of the first signal being the same as the level of the second signal;

a trigger circuit configured to receive the first output signal, output a high level in response to the phase of the first signal leading the phase of the second signal, and output a low level in response to the phase of the first signal lagging the phase of the second signal; and an AND gate operation circuit configured to receive a first output of the XOR operation circuit and a second output of the trigger circuit, perform an AND operation between the first output and the second output, and output a result of the operation to the average determination circuit.

7. The switching frequency adjusting circuit of claim 6, wherein the logic operation circuit further comprises:

a delay circuit connected between the trigger circuit and the first signal acquisition circuit.

8. The switching frequency adjusting circuit of claim 4, wherein the first signal acquisition circuit is connected to a drive circuit of the inverter switch, to obtain a drive voltage of the inverter switch as the first signal.

9. The switching frequency adjusting circuit of claim 4, wherein the first signal acquisition circuit comprises:

a voltage sensor configured to sample the output voltage of the inverter circuit to obtain a sampled voltage; and a first zero-crossing comparator configured to compare the sampled voltage with the zero voltage to obtain the first signal.

10. The switching frequency adjusting circuit of claim 4, wherein the second signal acquisition circuit comprises:

a current sensor configured to sample the output current of the inverter circuit to obtain a sampled current; and a second zero-crossing comparator configured to compare the sampled current with the zero current to obtain the second signal.

11. The switching frequency adjusting circuit of claim 1, wherein the phase difference determination circuit comprises:

a first signal acquisition circuit configured to compare the output voltage of the inverter circuit with a zero voltage to obtain the first signal.

12. The switching frequency adjusting circuit of claim 11, wherein the phase difference determination circuit further comprises:

a second signal acquisition circuit configured to compare the output current of the inverter circuit with a zero current to obtain the second signal.

13. The switching frequency adjusting circuit of claim 12, wherein the phase difference determination circuit further comprises:

a logic operation circuit configured to compare the first signal with the second signal, output the first output signal in response to the phase of the first signal leading the phase of the second signal, and output the second output signal in response to the phase of the first signal lagging the phase of the second signal.

14. The switching frequency adjusting circuit of claim 13, wherein the logic operation circuit further comprises:

an exclusive or (XOR) operation circuit configured to receive the first signal and the second signal, output a high level in response to a level of the first signal being different from a level of the second signal, and output a low level in response to the level of the first signal being the same as the level of the second signal.

15. The switching frequency adjusting circuit of claim 14, wherein the logic operation circuit further comprises:

a low level output circuit configured to output the second output signal.

16. The switching frequency adjusting circuit of claim 15, wherein the logic operation circuit further comprises:

a comparison circuit configured to compare the phase of the first signal and the phase of the second signal, and in response to the phase of the first signal leading the phase of the second signal, cause an output of the XOR operation circuit to be input to the average determination circuit, and in response to the phase of the first signal lagging the phase of the second signal, cause an output of the low level output circuit to be input to the average determination circuit.

17. The switching frequency adjusting circuit of claim 14, wherein the logic operation circuit further comprises:

a trigger circuit configured to receive the first output signal, output a high level in response to the phase of the first signal leading the phase of the second signal, and output a low level in response to the phase of the first signal lagging the phase of the second signal.

18. The switching frequency adjusting circuit of claim 17, wherein the logic operation circuit further comprises:

an AND gate operation circuit configured to receive a first output of the XOR operation circuit and a second output of the trigger circuit, perform an AND operation between the first output and the second output, and output a result of the operation to the average determination circuit.

19. The switching frequency adjusting circuit of claim 18, wherein the logic operation circuit further comprises:

a delay circuit connected between the trigger circuit and the first signal acquisition circuit.

20. An apparatus, comprising:

at least one electrical circuit configured to:

obtain a first signal related to an output voltage of an inverter circuit and a second signal related to an output current of the inverter circuit;

compare a phase of the first signal with a phase of the second signal;

selectively output a first output signal and a second output signal based on a result of the comparison, wherein the first output signal is associated with a phase difference between the first signal and the second signal, and wherein the second output signal is related to a fixed value;

determine a first average value of the first output signal and a second average value of the second output signal;

compare the first average value or the second average value with a reference value; and adjust a switching frequency of the inverter based on a result of the comparison, wherein the reference value is associated with a phase difference required for implementing soft switching of the inverter.

* * * * *